United States Patent [19]

Biegelmeier

[11] Patent Number: 4,541,030
[45] Date of Patent: Sep. 10, 1985

[54] PROTECTIVE ELECTRIC HOUSE-WIRING SWITCH

[75] Inventor: Gottfried Biegelmeier, Vienna, Austria

[73] Assignee: Brown, Bovery & Cie Aktiengesellschaft, Mannheim, Fed. Rep. of Germany

[21] Appl. No.: 547,880

[22] Filed: Nov. 2, 1983

[30] Foreign Application Priority Data

Nov. 2, 1982 [AT] Austria ................. 3989/82

[51] Int. Cl.³ ............................................. H02H 9/00
[52] U.S. Cl. ........................................ 361/56; 361/89; 361/111; 361/118; 361/93
[58] Field of Search ................. 361/103, 105, 106, 56, 361/89, 91, 93, 111, 118, 120

[56] References Cited

U.S. PATENT DOCUMENTS 3,934,175  1/1976  Clark ................................ 361/118 X
4,023,071  5/1977  Fussell ............................. 360/89 X
4,156,264  5/1979  Hoover ............................ 361/56 X Primary Examiner—Reinhard J. Eisenzopf
Attorney, Agent, or Firm—Herbert L. Lerner; Laurence A. Greenberg

[57] ABSTRACT

A protective house-wiring switch with an overcurrent tripping device in a housing containing terminals for phase conductors and a neutral conductor, contacts for interrupting at least the phase conductors, at least one switch latch having at least one device connected to the respective phase conductors for actuating the contacts to interrupt the phase conductors, includes two overvoltage arresters for each phase conductor connected in cascade in direction of energy flow within the housing, one of the two overvoltage arresters being connected to the respective phase conductor ahead of the contact actuating device, and the other of the two overvoltage arresters being connected to the respective phase conductor after the contact actuating device.

16 Claims, 11 Drawing Figures

PROTECTIVE ELECTRIC HOUSE-WIRING SWITCH

The invention relates to a protective house-wiring switch and, more particularly, to such a switch with an overcurrent tripping device and, preferably, also a fault-current tripping device in a housing, which is preferably constructed in the form of switch arrays, arranged side by side, for phase conductors and a neutral conductor, and wherein the terminals, the contacts for interrupting the phase conductors and the neutral conductor or a continuous neutral conductor, the switch latch or the switch latches with the thermal and electromagnetic tripping devices and, optionally, coils for lifting the contacts, as well as an electronic amplifying device or an electromechanical fault-current tripping device with the sum current transformer for the fault-current measurement and a testing device are accommodated.

Such protective switches which have an overcurrent tripping device and a fault-current tripping device, are known. Thus, German Published Prosecuted Application (DT-AS) No. 1 169 015 describes such a switch, wherein a component containing the fault-current tripping device is mounted, transversely to the connecting line between the terminals, to a component constructed as a protective line switch. Between the two components, a transmission member for the fault-current tripping device to act upon the switch latch is provided. In German Published Prosecuted Application (DT-AS) No. 1 256 775, an attempt is made to solve the problem by the provision that, in multipole switches, the spaces containing the switch contacts are arranged parallel to one another and parallel to the connecting line of the terminals, and the switch chamber is divided into three space parts, wherein switch poles and an arc-quenching device are accommodated in one space part, the short-circuit and overcurrent tripping device as well as the switch mechanism and the sum current transformer in a second space part, and the fault-current relay and the testing device are accommodated in a third space part. In German Published Prosecuted Application (DT-AS) No. 1 280 382, it is again proposed to make the LS switch part of each circuit branch independent of the other LS switch pole gaps and to check all branches jointly for fault current. Also, German Published Prosecuted Application (DT-AS) No. 1,563 827 uses, for a combined FI-LS switch, a protective fault-current switch, to which independent switches, especially line protection switches are mounted, the switch latches of which are coupled to one another in a suitable manner. In German Published Prosecuted Application (DT-AS) No. 2 754 033, FI switches and LS switches are connected to one another in such a way that there is only one common input terminal. The connection of two switch mechanisms for the fault-current protection switch and the line protection switch is also described in European Patent No. 0 014 871 and German Published Prosecuted Application (DT-AS) No. 2 654 373. Combined FI-LS switches with amplifying devices depending upon the line voltage are described, for example, in German Published Prosecuted Applications (DT-AS) No. 2 730 874, (DT-AS) No. 2 825 881, (DT-AS) No. 2 338 785 and (DT-AS) No. 2 924 122 and in British Patent No. 1 107 879. These solutions, however, describe only the electrical operation of these electronic circuits and not the basic construction of FI-LS switches.

In all of the hereinafore-described solutions, however, an important protection function, namely overvoltage protection, is lacking. In modern electrical installations, this protection becomes more and more important because more and more electronic components are used in electric operating means, which are particularly voltage-sensitive. Thus, each year, television sets, kitchen appliances with electronic controls, washing machines and the like are destroyed during the thunderstorm season by voltage surges, and the overvoltage protection devices with valve arresters used to date, usually installed in the overhead line or centrally in the house service connection or at the watt-hour meter, are not able to prevent this damage.

While attempts have been made heretofore to improve arrester technology, these attempts have not been successful to date. Thus, for example, an overvoltage arrester in series with an overcurrent protection switch, which disconnects the arrester if it fails, is described in French Patent No. 812,675. In order to prevent faulty tripping of the protective overcurrent switch, there is proposed in Austrian Patent A No. 3461/81 to combine the arrester in one housing with a protective overcurrent switch, the tripping of which is briefly delayed. In EDN Electrical News 1963.05, pages 12/13, "Circuit Breaker Combined Semiconductor, Magnetic Protection", a protective overcurrent switch is described, the magnetic tripping device of which is connected in series with or parallel to a semiconductor component which has a voltage-limiting effect; and finally, British Patent No. 2 010 613 provides a solution wherein, after a line protection switch (relative to the direction of the energy flow), a varistor is connected between the outer conductors and the potential equalizing bus. But not only for overcurrent protection switches, but also for protective fault-current switches, it has been proposed heretofore to arrange overvoltage arresters in a common housing with the FI protection switch, German Published Prosecuted Application (DT-AS) No. 3 029 453 A1, the overvoltage arresters being connected between the network conductors and ground or the potential equalizing bus.

All of these solutions, however, were unable to prevent damage in electrical installations by overvoltages from occurring time and time again. Thus, a protective house-wiring switch for effective overcurrent, overvoltage and voltage contact protection is lacking.

The reason for this unsatisfactory state of overvoltage protection engineering is that, while quite a number of components for overvoltage protection are available, each of which has advantages but also disadvantages, these components have not yet been combined in such a manner that surge voltage stresses in low-voltage installations, especially in the case of very steep voltage rises, are limited to values which are not dangerous for the insulation. It should be noted in this regard that additional voltage increases occur in the course of a line due to reflections, if the wave impedance of the line changes abruptly, inductances playing a special part because of the high frequencies of the surge voltage waves.

In detail, the following can be said about the overvoltage protection elements that are to be used:

Spark gaps or rare gas-filled arresters alone cannot be connected in the common networks for general power supply between phase conductors and the neutral conductor or the potential equalizing bar because, after the arresters have responded, the network short circuit current which occurs as the resulting current, can hardly be managed by the arrester. For this reason, voltage-dependent resistors must be connected in series and the currently conventional design or construction of the valve arresters is obtained thereby. The disadvantage thereof is the relatively long response time which is in the order of $10^{-7}$ to $10^{-6}$ sec. The advantage thereof is the galvanic separation of the ground connections from the network during normal operation and a relatively large energy absorption capacity.

Arresters which are formed only of metal oxide varistors cause no subsequent current from the network after they respond, and they respond in the order of nanoseconds ($10^{-9}$ sec). Such arresters establish a d-c connection, although with a very high resistivity, between the phase conductors and ground and, therefore, difficulties may arise with insulation measurements.

Zener diodes, which are usually employed in the form of suppressor diodes, have the advantage that their response time is in the picosecond range ($10^{-12}$ sec), but their energy absorption capacity is only in the order of magnitude of Joules, while the first-mentioned arrester types have an energy absorption capacity of several hundred or, indeed, thousand Joules.

Cascade protection in the form of coarse protection/fine protection and very fine protection is the only possible solution for the protection of a modern installation with electronic components, and combinations have already been described frequently (note Wessel, W., "Protective Measures against Overvoltages", Schadenprisma Vol. 1981, No. 2, p. 21, and Hasse, P., "Protection of Electronic Systems against Lightning Surge Voltages", ETZ-A, Vol. 100 (1979), Nos. 23 and 24, pages 1335 to 1340 and 1376 to 1380). They are used as so-called "Blitzductors" especially for measuring, control and regulating systems. Since they contain series impedances, they are not suitable for the surge voltage protection of the general power supply of low-voltage systems.

For such installations, an overvoltage protection device is described in U.S. Pat. No. 4,023,071 which provides in one housing a gas-filled arrester, a varistor and a Zener diode with several overcurrent protection and indicating devices. The three arresters are connected in parallel, and the unit is built-in in shunt to the system to be protected. According to this patent, a cascaded surge voltage protection device is to be constructed. The Zener diode responds first after a response time in the picosecond range ($10^{-12}$ sec); before it is overloaded, the metal oxide varistor switches in the nanosecond range and, finally, the gas-filled arrester takes over the discharge and thereby protects the varistor against overloading. For the case of a fault (ground current), various overcurrent protection members are provided. However, this arrangement is not realizable because what is overlooked is that, with the low network impedance, the gas-filled arrester can no longer be extinguished after being ignited, and would explode.

It is accordingly an object of the invention to provide a protective house-wiring switch of the type mentioned at the introduction hereto with which, in addition to the overcurrent and fault current protection, surge voltage protection is obtained in a technically simple and economical manner.

With the foregoing and other objects in view, there is provided, in accordance with the invention, in cascade fashion, relative to the direction of energy flow, two surge voltage arresters on each phase conductor in the housing of the protective house-wiring switch, one surge voltage arrester being connected to the phase conductor ahead of the coil or coils of the electromagnetic tripping device or the coil or coils for lifting the contacts, and the second surge voltage arrester is connected to the phase conductor after the coil or coils of the electromagnetic tripping device or the coil or coils for lifting the contacts.

The just-mentioned coil or coils represent herein a natural series impedance in the course of the line, which causes a partial reflection because of the high frequency of the surge wave. Thereby, only part of the energy arrives at the surge voltage arrester which is mounted after the coil. Between these connections, of course, the thermal tripping device can also be located, however, because of the frequency independence of its resistance, the thermal tripping device, under surge stress, can contribute only little to the series impedance. The terminals of the two arresters provided for ground connection are connected in a null-connected network (TN network) to the neutral conductor in the house-wiring switch, which is connected via the distribution panel to the potential-equalizing bus and/or the protection conductor.

In a system, wherein protective grounding or a protective FI circuit is used, terminals of the two arresters provided for grounding are preferably connected to the protective conductor. However, they can also be connected to the neutral conductor. If then, further, as already conventional today, arresters with spark gaps are built additionally into the house-wiring switch according to the invention in the meter distributor, a triple cascade for the surge voltage protection is obtained which also protects sensitive electronic components in the installation, to a great extent. In null-connected systems, three and otherwise four arresters are required in the meter distributor.

The two arresters in the house-wiring switch are matched to one another in the house-wiring switch in such a way that they cooperate with respect to the response voltage, response time and energy absorbing capacity, the arrester mounted ahead of the coil or coils having to leak off the major part of the surge energy and protecting the arrester connected after the coil or coils against overload. According to the invention, the arrester which is connected to the phase conductor ahead of the coil or coils, advantageously has a response time in the order of a few tenths to several times ten nanoseconds ($10^{-9}$ sec) and an energy absorption capacity as large as possible, and the arrester which is connected to the phase conductor after the coil or coils has a shorter response time down to a few picoseconds ($10^{-12}$ sec) and a smaller energy absorption capacity. According to the invention, both arresters are matched to one another in such a way that even before the largest permissible energy absorption of the arrester responding first is exceeded, the later-responding arrester begins its energy absorption and, in this manner, both arresters are protected in the normal operating range against overloading and destruction, and the electric installation is protected against overvoltages to a very great extent.

According to another feature of the invention, the arrester which is connected to the phase conductor ahead of the coil or coils, is formed of a metal oxide varistor, and the arrester which is connected to the phase conductor after the coil or coils is realized as a suppressor diode (TAZ diode). According to a further feature of the invention, the connection of the two arresters to the neutral conductor is effected ahead of the break contact of the neutral conductor (as seen in the direction of the energy flow), if such is provided.

In some wiring specifications, the neutral conductor is only brought through but is not switched. In this case, fault-finding presents difficulties if the neutral conductor is shorted to ground and, since the arresters are connected between the outer conductors and the neutral conductor, an insulation check between the outer and neutral conductors can no longer be performed. These difficulties are avoided if the neutral conductor is switched and the arresters are connected ahead of the break contact. If the switch is opened, the arrester leads are separated from the neutral conductor on the installation side, and an insulation check between the outer and the neutral conductors can be performed without trouble.

According to an added feature of the invention, one or both arresters are connected to the phase conductor after (as referred to the direction of the energy flow) the sum current transformer, so that, if an arrester is damaged, even smaller network currents which flow through the arrester lead to a response of the fault current tripping device. In order to make the protective house-wiring switch insensitive to surge currents and to prevent it from being tripped by resultant currents or arresters which are connected to the phase conductor after the sum current transformer, the fault-current tripping device can be tripped, according to an additional feature of the invention, via a time delay element.

If this fault-current tripping device has electronic components, they can be protected against overvoltages according to yet another feature of the invention, if they are connected parallel to the surge voltage arrester which responds first.

In accordance with a concomitant feature of the invention, the arrester responding first can be connected parallel to the terminals on the installation side, and the arrester responding subsequently can be connected directly to the terminals of the protective house-wiring switch on the network side.

Construction-wise, the protective house-wiring switch is realized, according to the invention, somewhat so that the housing is formed of switching arrays, arranged side by side, for the phase conductors and the neutral conductor, and the two arresters are accommodated in an additional part, the shape of which is matched or accommodated to the switching arrays and this part is arranged beside or between the switching arrays for the phase conductors and the neutral conductor. However, two added-on parts may also be provided which are connected by plug or screw connections or in another suitable manner to the main part of the protective house-wiring switch, the later-responding arrester group being accommodated in one added part which carries the terminals on the network side, and the arrester group which responds first being accommodated in the other part which carries the terminals on the equipment side.

Other features which are considered as characteristic for the invention are set forth in the appended claims.

Although the invention is illustrated and described herein as embodied in a protective electric house-wiring switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
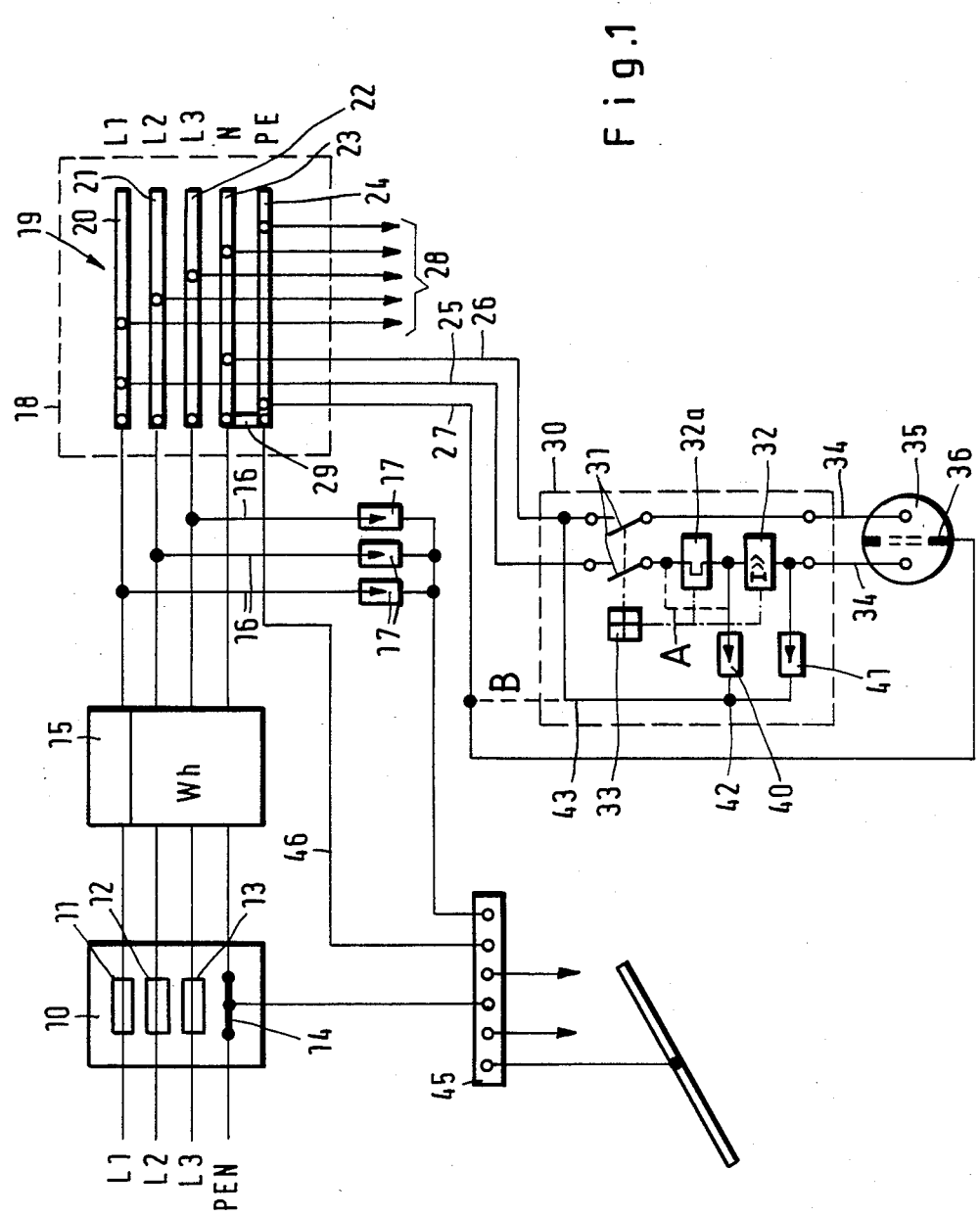
FIG. 1 is a circuit diagram of an arrangement for protecting a plug outlet in a null-connected system with the protective house-wiring switch according to the invention.

Referring now to the drawing and first, particularly, to FIG. 1 thereof, there is shown a circuit arrangement with which a plug outlet in a null-connected system is reached by means of a protective house-wiring switch with a built-in overcurrent tripping device.

A network from which a current branch to be protected is branched-off (note hereinbelow) is formed by phase conductors L1, L2, L3 and a PEN conductor. For protecting the phase conductors, a fuse box 10 with main fuses 11, 12 and 13 is provided, a T-connection 14 being provided in the PEN conductor. Behind the fuse box 10, there is a watt-hour meter 15 which serves in a conventional manner for determining the current taken off. Such a meter may be constructed, for example, as an eddy current meter.

Behind the meter 15, branch lines 16 are connected into which overvoltage arresters 17 are inserted. Into a housing 18, marked by broken lines, a meter distributor 19 is built which has distribution bars 20 and 24 from which branch lines 25, 26 and 27, on the one hand, and 28, on the other hand, respectively, are branched off. The distribution bar 20 is associated with the phase conductor L1, the distribution bar 21 with the phase conductor L2, the distribution bar 22 with the phase conductor L3, the distribution bar 23 with the neutral conductor N and the distribution bar 24 with the PEN conductor; the PEN conductor is distributed within the meter distribution, for one, in the distribution bar 23 for the neutral conductor N and in the distribution bar 24 for the PEN conductor via an intermediate piece 29.

The branch lines 25 to 27 will now be considered. The branch line 25 is connected to the distribution bar 20 associated with the phase conductor L1, and the phase conductor 26 is connected to the distribution bar associated with the neutral conductor N. The branch line 27 is seated on the distribution bar 24 which is associated with the PEN conductor.

The two phase conductors 25 and 26 are connected to the otherwise non-illustrated terminals of a protective house-wiring switch 30 which has break contacts 31 for the two branch conductors 25 and 26 which are actuated by a thermal overcurrent relay 32 inserted into the phase conductor 25 and an electromagnetic tripping device 32a. A thermo-bimetal tripping device may be provided as a thermal overcurrent tripping device, while an electromagnetic relay coil of conventional construction can be used as the magnetic tripping device. The permanent release of the switch contacts 31 is accomplished via a switch latch 33 which is likewise constructed in a conventional manner. The broken lines correspond to lines of action of the electromagnetic and thermal tripping device as well as to the lines of action of the switch latch 33 on the contacts.

The other end of the protective house-wiring switch 30 is connected via connecting lines 34 to an outlet 35 which is wired to a protective conductor 36 tied to the bar 24.

Between the thermal overcurrent tripping device 32 and the magnetic tripping device 32a, respectively, a surge voltage arrester 40 is connected and, following the magnetic tripping device 32, a further surge voltage arrester 41, another leg of which is connected together with another leg of the surge voltage arrester 40 at 42, and is connected via an intermediate conductor 43 to the neutral conductor 26. The arrester 41 is constructed so that it responds first, while the arrester 40 is constructed so that it responds later. The arrester 41, which responds first, is arranged, as referred to the network, following the electromagnetic tripping device i.e. after the coil 32a, while the later-responding arrester 40 is arranged before the coil 32a or, as is indicated by the broken line A, ahead of the coil 32a and ahead of the thermal tripping device 32 and is connected to the phase conductor 25. The terminals of the two arresters 40 and 41 which are provided for the connection to ground, are connected ahead of or after the break contact to the neutral conductor N and/or also to the protective conductor: see the broken-line connection B.

Starting from the terminal 14, the PEN conductor is connected to a potential-equalizing bar 45, to which additionally, also the PEN conductor or the connecting bar 24 is connected. To this potential-equalizing bar 45, there are also connected the protective conductors of the system and the overvoltage arresters 17, respectively.

Figure 2:
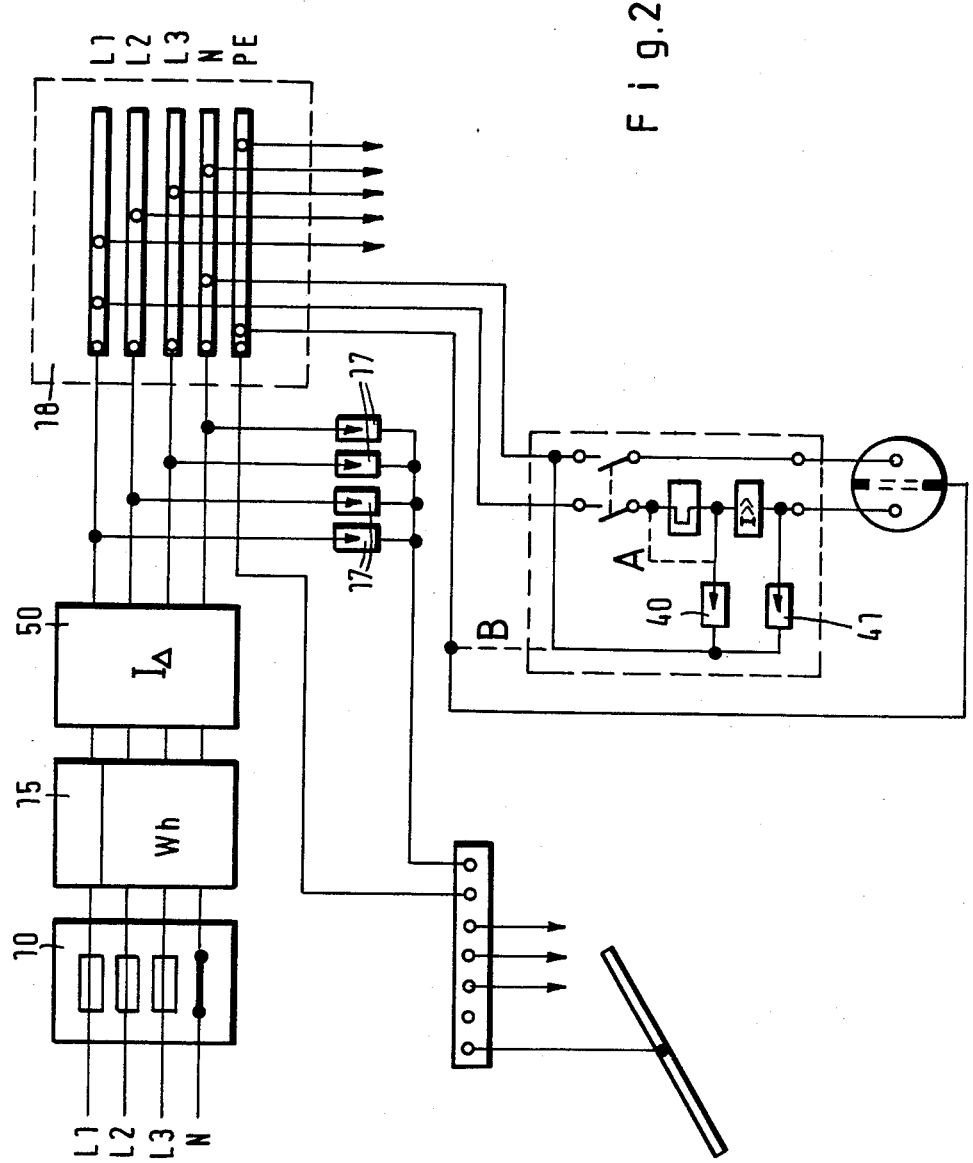
FIG. 2 is a circuit diagram of an arrangement for protecting a plug outlet in a system with the protective house-wiring switch according to the invention protected by a protective fault-current circuit.

FIG. 2 shows a circuit arrangement similar to that of FIG. 1. Between the meter 15 and the distribution box 18, a fault-current evaluating device 50 is connected, which may be constructed in conventional manner as a fault-current protection component or as a protective fault-current switch. This embodiment is not of vital importance for the invention itself, but serves to point out that the invention can be used also if a fault-current determining component 50 is provided. Contrary to the circuit arrangement according to FIG. 1, the connection of the PEN conductor to a potential-equalizing bar is missing and, in addition, four surge voltage arresters 17 must be built into the meter distribution device, and more specifically, an additional surge voltage arrester for the neutral conductor N. The arresters 40 and 41 are arranged in the same manner as in the circuit arrangement according to FIG. 1; they must be connected to the neutral conductor N or to the PEN conductor and the protective conductor, respectively, in accordance with the connection B shown in broken lines. In this case, a simultaneous connection to protective and neutral conductors is not permissible because, thereby, the series-connected fault-current protection switch 50 would be tripped incorrectly. This applies also to null-connected systems, in which protective fault-current switches are built-in, for example, for fire protection.

Figure 3:
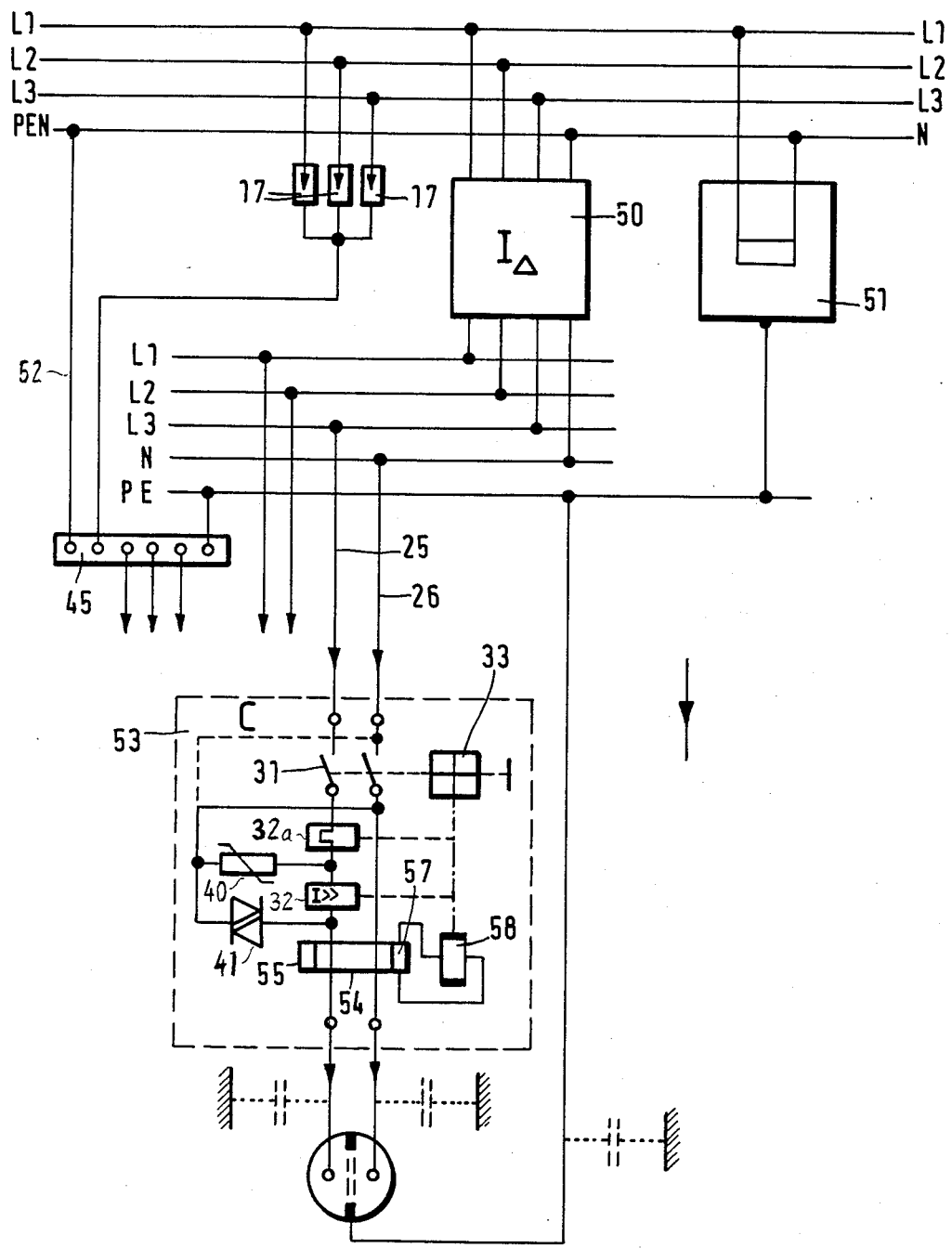
FIG. 3 is a circuit diagram of an arrangement for protecting a plug outlet in a null-connected system with a protective house-wiring switch having an overcurrent and fault-current tripping device.

FIG. 3 shows, by way of an example, the protection of an outlet in a null-connected installation or system through the protective house-wiring switch according to the invention with an overcurrent and fault-current tripping device. The protective measure of "nulling" (TN network) is established by a null connection 52 from the PEN conductor to the potential equalizing bar 45. For additional fire protection, a fault-current protection switch 50 is centrally mounted in the meter distribution selectively as to surge current resistance. In the house terminal box or at the meter, or less advantageously on the last overhead line mast, three surge voltage arresters 17 are arranged. Permanently connected loads 51, for example freezers, are grounded directly. The protective house-wiring switch according to the invention protects the outlet circuits. The protective house-wiring switch with a housing 53 thereof is formed of the break contacts 31 which are actuated by the switch latch 33. The switch latch is actuated either by the thermal tripping device 32a, the electromagnetic tripping device 32, or by a fault-current tripping device 54. The sum-current transformer 55 serves for determining the fault current. Ahead of the coil 32, an arrester 40, for example, a metal oxide varistor, is connected to the phase conductor. After the coil 32, the arrester 41, for example, in the form of a suppressor diode, ensures that overvoltages leak off. Accordingly, the outlet 35 is protected completely against overcurrents, fault currents and overvoltages. The common connecting lead of the two arresters 40 and 41 for connection to the neutral conductor can be made either before or after the break contacts 31 (broken-line connection C).

The circular or annular sum-current transformer 55 is penetrated by the conductors 25 and 26 as primary winding. A secondary winding 57 is connected to a tripping relay 58 which is released by the switch latch 33 as well as are the thermal and the electromagnetic tripping devices 32a and 32, respectively.

Figure 4:
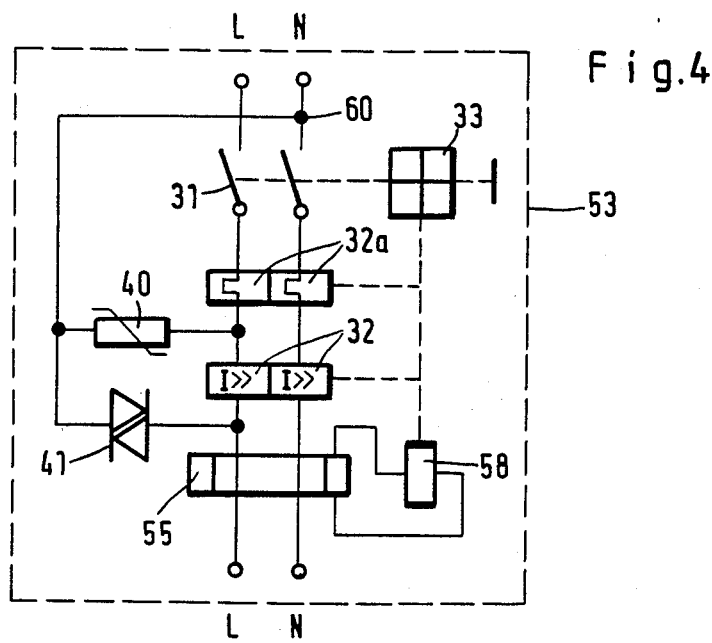
FIG. 4 is a circuit diagram of an embodiment of a protective two-pole house-wiring switch according to the invention.

FIG. 4 shows, by way of example, a two-pole house-wiring protection switch which has overcurrent tripping devices 32a and 32 also in the neutral conductor N and wherein the arresters 40 and 41 are connected at 60 on the side of the neutral conductor N ahead of the break contacts 31. Thereby, it is possible to measure the insulation resistance and find faults on the load side with the switch turned off.

Figure 5:
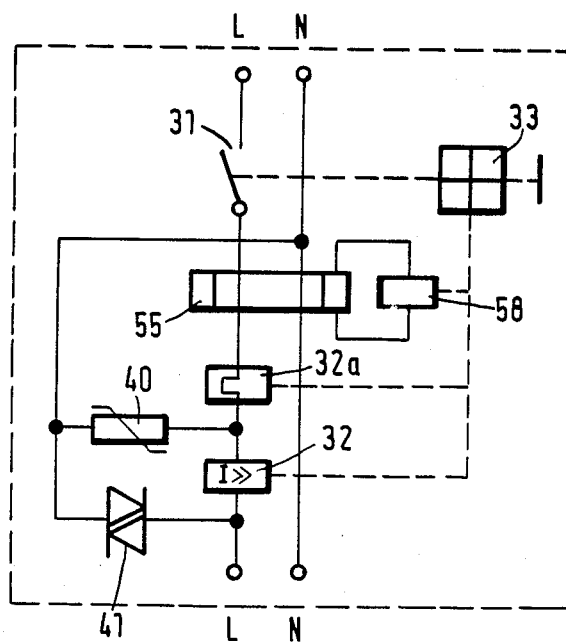
FIG. 5 is a circuit diagram of another embodiment of a protective house-wiring switch according to the invention.

FIG. 5 shows, by way of example, the construction of a protective house-wiring switch, wherein the sum-current transformer 55 is arranged directly after the break contacts 31, both arresters 40 and 41 being protected by the fault-current tripping device in the event of a failure. In this construction, the neutral conductor N is brought through the switch without a break contact, as is customary in some grounding systems.

Figure 6:
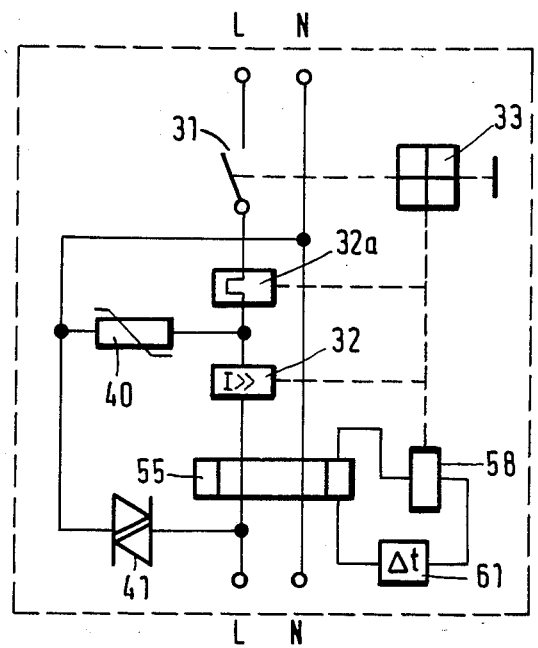
FIG. 6 is a circuit diagram of a modified embodiment of the invention similar to that of FIG. 5.

FIG. 6 shows a similar embodiment to that of FIG. 5 wherein, however, only the suppressor diode 40 is connected after the sum-current transformer 55 and is protected by the fault-current tripping device. Advantageously, the fault-current tripping device will be made surge-current resistant by incorporating a time delay element 61.

Figure 7:
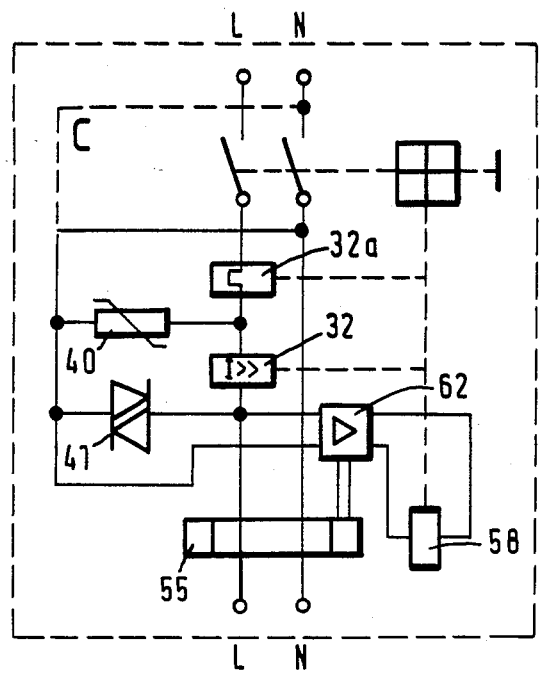
FIG. 7 is a circuit diagram of a further embodiment of a protective house-wiring switch with a fault-current tripping device dependent upon the line voltage.

FIG. 7 shows, by way of example, a protective house-wiring switch with line-voltage-dependent fault-current tripping via an electronic amplifier 62 shich is connected to the network parallel to the suppressor diode 41, the electronic components being protected against surge voltages. Here, too, the common connecting lead of the two arresters 40 and 41 can be connected to the neutral conductor N before or after the break contacts 13 (note the broken line connection C).

Figure 8:
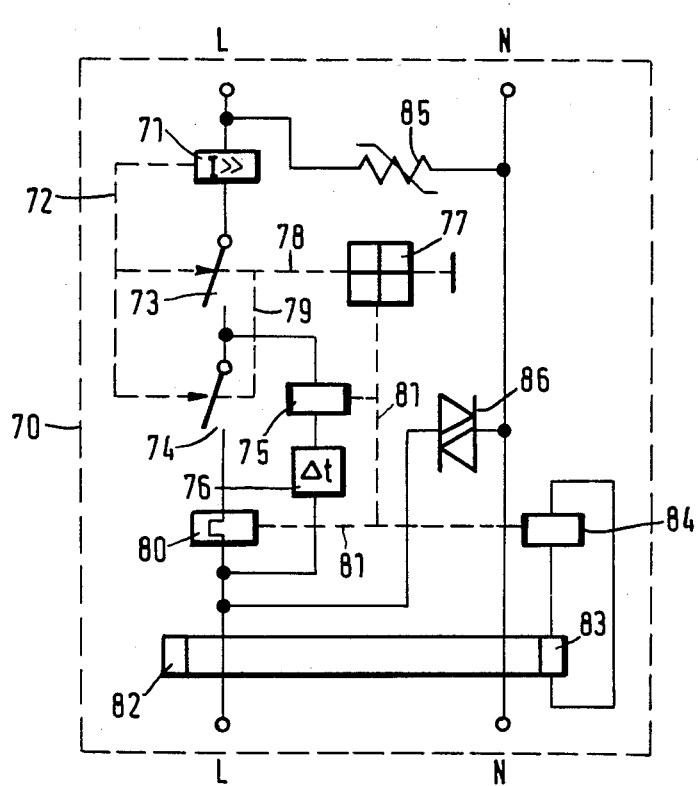
FIG. 8 is a circuit diagram of an automatic main fuse according to the invention.

FIG. 8 shows, by way of example, an automatic main fuse box 70 with an electromagnetic impact-armature system 71 which acts via an action line 72, shown broken, on two contact points 73 and 74 to open the latter in the event of a short circuit, thereby limiting the current. If the short circuit is switched off by a following protective line switch, the contacts close again and the automatic main fuse remains in the ON position. If the short circuit remains i.e. if a short circuit occurs immediately behind the automatic main fuse box or the nearest protective line switch is damaged, the current is communicated by means of the contact or the opening of the contact point 74 to a selective-protection tripping device 75 which, influenced by a time delay element 76, releases a switch latch 77 and thereby opens the contacts 73 and 74 permanently via the action lines 78 and 79. Between the contact 74 and the connection of the time delay element 76 to the phase conductor, a thermal tripping device 80 is arranged, for example, in the form of a thermo-bimetal strip which acts via the action line 81 upon the switch latch 77. Behind the tripping device 80, a sum-current transformer 82 is inserted, the secondary winding 83 of which actuates a tripping relay 84 which likewise acts upon the switch latch 77. The switch 70 has a first arrester 85 which is connected with one leg thereof to the phase conductor L between a terminal of the switch 70 and the coil of the armature system 71, and with the other leg thereof to the neutral conductor N. This arrester 85 is a metal oxide varistor. After the thermal tripping device 80 and, likewise, tied to the neutral conductor N, there is connected a further arrester 86, both of the arresters 85 and 86 being related to one another in such a manner that the arrester 85 which corresponds to the arrester 40 (FIG. 7) responds faster and has a smaller energy absorption capacity than the arrester 85 which then also serves for protecting the arrester 86.

Figure 9:
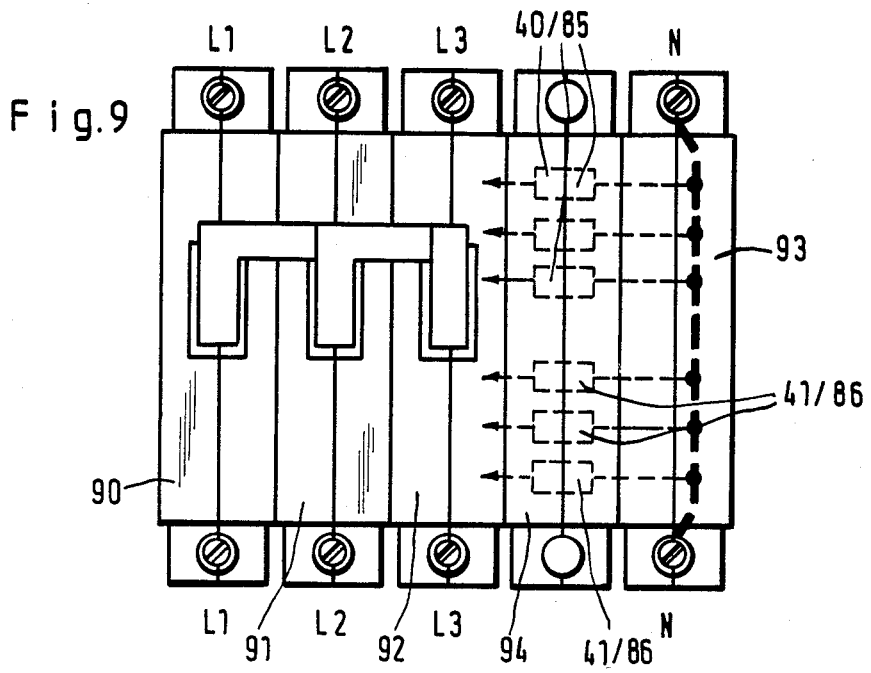
FIG. 9 is a top plan view of one embodiment of a protective house-wiring switch according to the invention.

FIG. 9 shows, by way of example, a protective house-wiring switch with a housing formed of switching arrays, arranged side by side, for the phase conductors 90, 91, 92 and for the neutral conductor 93. An additional part 94, the shape of which is matched to the switching arrays for the phase conductors and the neutral conductor and in which the surge voltage arrester groups 40/85 and 41/86 are accommodated, is arranged between the switching arrays for the phase conductors and the neutral conductor.

Figure 10:
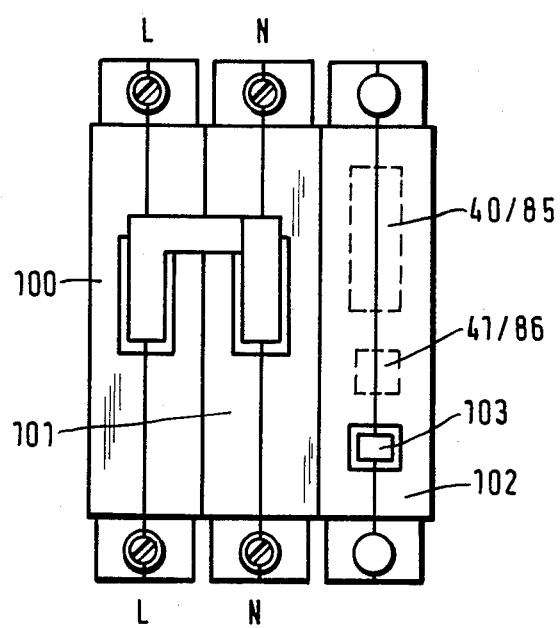
FIG. 10 is a top plan view of another embodiment of a protective house-wiring switch according to the invention.

FIG. 10 shows, by the way of example, a protective house-wiring switch with a housing, which is formed of switching arrays, arranged side by side, for a phase conductor 100 and for a neutral conductor 101. An additional part 102, the shape of which is matched to the switching arrays for the phase conductor and the neutral conductor and in which the two surge voltage arresters 40/85 and 41/86 as well as a testing device 103 for the fault-current tripping device 103 are accommodated, is fastened next to the switching arrays for the phase conductor and the neutral conductor. For the sake of simplicity, conventional circuits for a testing device 103 are not shown in FIGS. 1 to 9.

Figure 11:
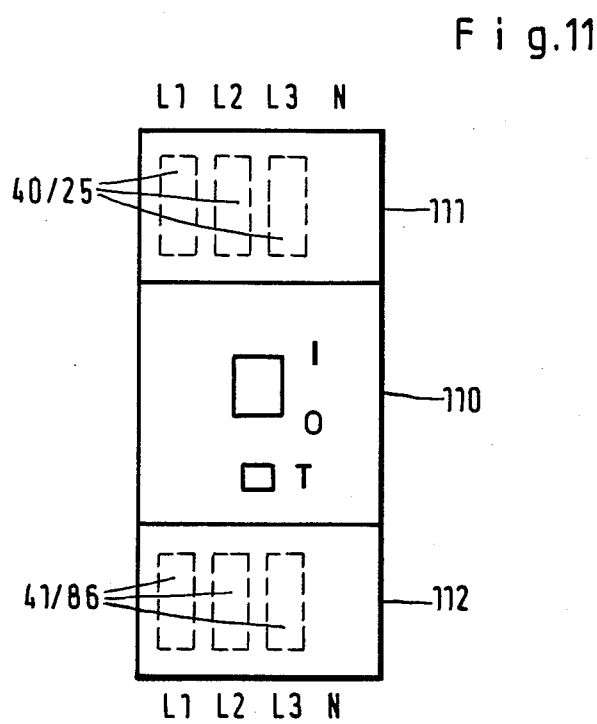
FIG. 11 is a schematic view, partly diagrammatic, of a protective house-wiring switch according to the invention, showing all of the functional elements of the invention.

FIG. 11 shows, by way of example, a protective house-wiring switch with a main part 110 which contains all functional electrical elements for overcurrent and fault-current tripping, and two added parts 111 and 112 which are connected to the main part of the protective house-wiring switch by plug or screw connections or of a different suitable type, whereby, in that added part which carries the terminals on the network side, the later-responding arrester group 40/85 is accommodated and, in the other added part 112 which carries the terminals on the equipment side, the initially responding arrester group 41/86 is accommodated.

The foregoing is a description corresponding in substance to Austrian Application No. 3989/82, dated Nov. 2, 1982, the International priority of shich is being claimed for the instant application, and which is hereby made part of this application. Any material discrepancies between the foregoing specification and the aforementioned corresponding Austrian application are to be resolved in favor of the latter.

I claim:

1. Protective house-wiring switch with an overcurrent tripping device in a housing containing terminals for phase conductors and a neutral conductor, contacts for interrupting at least the phase conductors, at least one switch latch having at least one device connected to the respective phase conductors for actuating the contacts to interrupt the phase conductors, comprising two overvoltage arresters for each phase conductor connected in cascade in direction of energy flow within the housing, one of said two overvoltage arresters being connected to the respective phase conductor ahead of said contact actuating device, and the other of said two overvoltage arresters being connected to the respective phase conductor after said contact actuating device.

2. Switch according to claim 1 wherein said two overvoltage arresters have different response times and are matched to one another so that, before a maximally permissible energy absorption of the earlier responsive arrester is exceeded, energy absorption of the later responsive arrester is initiated.

3. Switch according to claim 2 wherein said terminals are located both at the equipment and the network side of the switch, and wherein the earlier-responsive overvoltage arrester is connected in parallel with said terminals on the equipment side, and the later-responsive overvoltage arrester is directly connected in parallel with said terminals on the network side.

4. Switch according to claim 3 having a main part and two additional parts connected to said main part, one of said additional parts carrying the terminals on the network side, and the other of said additional parts carrying the terminals on the equipment side, said later-responsive overvoltage arrester being in said one additional part, and said earlier-responsive overvoltage arrester being in said other additional part.

5. Switch according to claim 2 wherein the overvoltage arrester connected to the respective phase conductor ahead of said contact actuating device has a response time, upon occurrence of a voltage-wave surge, in the order of magnitude of several tenths of to several times ten nanoseconds ($10^{-9}$ s) and has a given maximum energy absorption capacity, and the overvoltage arrester connected to the respective phase conductor after said contact actuating device has a shorter response time down to several picoseconds ($10^{-12}$ s) and has a given maximum energy absorption capacity smaller than that of the overvoltage arrester connected ahead of said contact actuating device, both of said overvoltage arresters being matched to one another so that even before said given maximum energy absorption capacity of the earlier responsive overvoltage arrester is exceeded, the later responsive overvoltage arrester begins to absorb the energy.

6. Switch according to claim 1 wherein said overvoltage arrester connected ahead of said contact actuating device is a metal oxide varistor and said overvoltage arrester connected after said contact actuating device is a suppressor diode.

7. Switch according to claim 1, including a contact for interrupting the neutral conductor, and wherein said two overvoltage arresters are connected to the neutral conductor ahead of said interrupting contact thereof, as viewed in direction of energy flow.

8. Switch according to claim 1, including a fault-current tripping device having a sum-current transformer connected to the phase conductors, at least one of said two overvoltage arresters being connected to the respective phase and conductor after said sum-current transformer, as viewed in direction of energy flow, whereby even small network currents flowing through the respective overvoltage arrester produce a response of said fault-current tripping device.

9. Switch according to claim 8 including a time delay element connected to said fault-current tripping device for preventing incorrect tripping by surge currents and by responses of said overvoltage arresters.

10. Switch according to claim 8 wherein said fault-current tripping device having circuits with electronic components for effecting fault-current tripping, said circuits being connected in parallel with an earlier responsive one of said two overvoltage arresters so as to be protected against overvoltage damage.

11. Switch according to claim 1, wherein said housing comprises switching arrays located side by side, and said overvoltage arresters are located in a separate part having a shape matching that of said switching arrays, said separate part being located adjacent switching arrays for outer ones of the phase conductors, and the neutral conductor.

12. Switch according to claim 1 wherein the neutral conductor is continuous and has no contact within the housing.

13. Switch according to claim 1 wherein the switch latch comprises thermal and electromagnetic switching devices.

14. Switch according to claim 1 wherein the switch latch further comprises at least one coil for lifting the contacts.

15. Switch according to claim 1 including an electronic amplifying device connected to said other of said two overvoltage arresters connected after said contact actuating device.

16. Switch according to claim 1 including a fault-current tripping device connected to the phase conductors and a testing device for checking said fault-current tripping device.

* * * * *